United States Patent [19]
Keary

[11] Patent Number: 5,887,619
[45] Date of Patent: Mar. 30, 1999

[54] DRY DISCONNECT COUPLING ASSEMBLY

[76] Inventor: John Robert Keary, 9378 W. Oaklawn Rd., Biloxi, Miss. 39532

[21] Appl. No.: 763,044

[22] Filed: Dec. 10, 1996

[51] Int. Cl.[6] .................................................... E03B 65/20
[52] U.S. Cl. ................................. 137/614.18; 137/68.14; 137/614.19
[58] Field of Search .......................... 137/68.14, 614.18, 137/614.19, 614.11; 251/265

[56] References Cited

U.S. PATENT DOCUMENTS

| | | | |
|---|---|---|---|
| 1,051,690 | 1/1913 | Colwell | 137/614.19 |
| 1,862,111 | 6/1932 | Conran | 137/68.14 |
| 2,165,640 | 7/1939 | Marx | 137/68.14 |
| 2,792,014 | 5/1957 | Granberg | 137/614 |
| 3,168,125 | 2/1965 | Rosell | 141/346 |
| 3,168,906 | 2/1965 | Brown | 137/614 |
| 3,999,567 | 12/1976 | Robinson | 137/68.14 |
| 4,306,739 | 12/1981 | Bormioli | 285/18 |
| 4,488,704 | 12/1984 | Wicker | 251/265 |
| 4,519,411 | 5/1985 | Takahashi | 137/68.14 |
| 4,854,338 | 8/1989 | Grantham | 137/68.14 |
| 4,898,199 | 2/1990 | Morris et al. | 137/68.14 |
| 4,921,000 | 5/1990 | King et al. | 137/68.14 |
| 4,971,096 | 11/1990 | Perrine | 137/68.14 |
| 5,174,332 | 12/1992 | Yokoyama et al. | 137/614.19 |
| 5,193,569 | 3/1993 | Moore et al. | 137/71 |
| 5,209,262 | 5/1993 | Carow et al. | 137/68.14 |
| 5,244,006 | 9/1993 | Pettesch | 137/68.14 |

*Primary Examiner*—Denise L. Ferensic
*Assistant Examiner*—John Ball
*Attorney, Agent, or Firm*—Garvey, Smith, Nehrbass & Doody LLC

[57] ABSTRACT

A dry disconnect coupling assembly which includes a body with a first end flangedly connected to a manifold and a second end releasably secured to an angle valve, for allowing fluid to flow through the coupling assembly. At the point of engagement between the assembly body and the angle valve, there is included a first angle poppit valve for sealably engaging against the inner wall of the flow bore of the angle valve and a check valve for sealably engaging against the internal wall of the assembly body, with the angle poppit valve and the assembly body sealing adjacent one another for providing minimal space therebetween. Should there be a need for a controlled break in the engagement between the angle valve and the assembly body, the poppit valve would be controllably moved to its sealing position by the actuator, and the check valve will be controllably moved to its sealing position by a coil spring, so that any fluid which may be contained in the assembly body will be sealed between the ship's manifold and the assembly check valve, and any fluid which may be contained within the angle valve will be sealed between the poppit valve and the flow bore of the angle valve. The controlled closure of the valves dissipates back pressure buildup in the system, while the positioning of the valving elements results in a minimal amount of fluid spillage left in the space between the two valving elements.

21 Claims, 8 Drawing Sheets

DRY DISCONNECT COUPLING ASSEMBLY

BACKGROUND OF THE INVENTION

1. Field of the Invention

The apparatus of the present invention relates to couplings. More particularly, the present invention relates to an improved adaptor check valve assembly which would be utilized in the event a controlled disconnect of the coupling between the assembly and a manifold is required, such as a ship's manifold for transporting fluid into and out from the ship's storage tanks, without resulting in spillage.

2. General Background of the Invention

In various industries, such as the shipping industry, or the chemical industry, couplings between delivery systems and manifolds are quite common. For example, in the chemical industry, couplings must be secure, and if a break in the coupling is required, because of the often hazardous nature of the material flowing through the coupling, there should be a means for a controlled disconnect at the manifold, so that the hazardous material will not go into the surrounding environment.

Likewise, in the shipping industry, ships such as tankers or the like are utilized to transport vast quantities of fluids, such as petroleum products and other types of fluids, between destinations throughout the world. Quite often, the fluids which are transported are highly volatile fluids such as oil and gas products, or other volatile chemicals which may be either of a flammable nature or, if exposed to the environment, do severe damage to the surrounding environment.

Therefore, it is imperative that when such fluids are loaded onto the ship or pumped from the ship's holding tanks, that the apparatus which is coupled to the ship's manifold be of a nature that would provide the safest and most secure design for assuring that should excessive pressure be brought upon the assembly, and the assembly need to be disengaged from the ship's manifold, that there be a system whereby the valving system can be closed in a controlled manner. This is vital since, if the closing of the valving system is instantaneous, a serious back pressure would result in the system, resulting in rupturing of the lines, and spilling of what may be a very dangerous product into the environment. Further, when the controlled break is undertaken, there should be a minimal loss of fluid to the surrounding environment, and of course, if it is a highly flammable fluid, that no potential fire may occur at that instant.

Currently, in the state of the art there are various valving assemblies which are utilized which would help to control the situation should a controlled break in the coupling need to be undertaken. For example, there are known to have ball valve assemblies where when there is a potential break, a ball is seated in the assembly and the flow of fluid is interrupted. However, because of the nature of the valving mechanism, there may be several gallons of fluid which are spilled in spite of the fact that the flow is sealed off because of the valving mechanism within the assembly.

Several patents have been issued on coupling assemblies, and these are incorporated into the statement of the art list which is incorporated herein. However, there is still a need in the art for a dry disconnect coupling assembly which would be provided so that should there be a controlled break in the valving assembly due to some problem in the system, there will be a minimal loss of fluid after the flow of fluid has been sealed off; and, because of the nature of the improved valving assembly, there would be no loss of fluid, and the valving mechanism would assure a consistent and overall constant seal of fluid flow.

SUMMARY OF THE INVENTION

The apparatus and assembly of the present invention solves the shortcomings in the art in a simple and straight forward manner. What is provided is a dry disconnect coupling assembly which includes a body with a first end flangedly connected to a manifold and a second end releasably secured to an angle valve, for allowing fluid to flow through the coupling assembly. At the point of engagement between the assembly body and the angle valve, there is included a first angle poppit valve for sealably engaging against the inner wall of the flow bore of the angle valve and a check valve for sealably engaging against the internal wall of the assembly body, with the angle poppit valve and the assembly body sealing adjacent one another for providing minimal space therebetween. There is further included an actuator assembly which would linearly move the poppit valve and angle valve from first open positions to allow fluid flow within the space between the valves and the internal walls of the angle valve and check valve, to second closed positions, interrupting fluid flow. Should there be a need for a controlled break in the engagement between the angle valve and the assembly body, the poppit valve would be controllably moved to its sealing position by the actuator, and the check valve will be controllably moved to its sealing position by a coil spring, so that any fluid which may be contained in the assembly body will be sealed between the ship's manifold and the assembly check valve, and any fluid which may be contained within the angle valve will be sealed between the poppit valve and the flow bore of the angle valve. The controlled closure of the valves dissipates back pressure buildup in the system, while the positioning of the valving elements results in a minimal amount of fluid spillage left in the space between the two valving elements.

Therefore, it is the principal object of the present invention to provide an improved adaptor check valve assembly which may be mounted onto a ship's manifold, for allowing fluid flow therethrough yet for sealing in such a manner as to prevent a minimal loss of fluid should there need to be a controlled break between the check valve assembly and the angle valve secured thereto;

It is a further object of the present invention to provide an improved adaptor check valve assembly engaged to an angle valve, with the valving mechanism of the angle valve and check valve assembly being actuated by a linearly engaged shaft from an actuator, so as to provide direct valving movement of the valves which would ensure sealing of the check valve assembly and the angle valve assembly should there be a controlled break between the two assemblies;

It is a further object of the present invention to provide a relatively simple and secure valving mechanism which allows fluid flow to and from a ship's manifold yet insures sealing off of the fluid flow should there be a controlled break in the valving assembly due to a malfunction in the delivery system.

It is a further object of the present invention to provided a valving system for connecting to a ship or chemical barge manifold which provides for a means to controllably disengage a coupling after the valving system has sealed fluid flow off on both sides of the disengagement point, to prevent loss of any fluid at the point of disengagement.

It is a further object of the present invention to provide a dry disconnect coupling assembly for allowing the flow of fluid through the system to be controllably interrupted by sealing off valving elements on both sides of the disconnect point, so that back pressure does not develop in the system when the valving elements are closed to prevent fluid flow.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1:
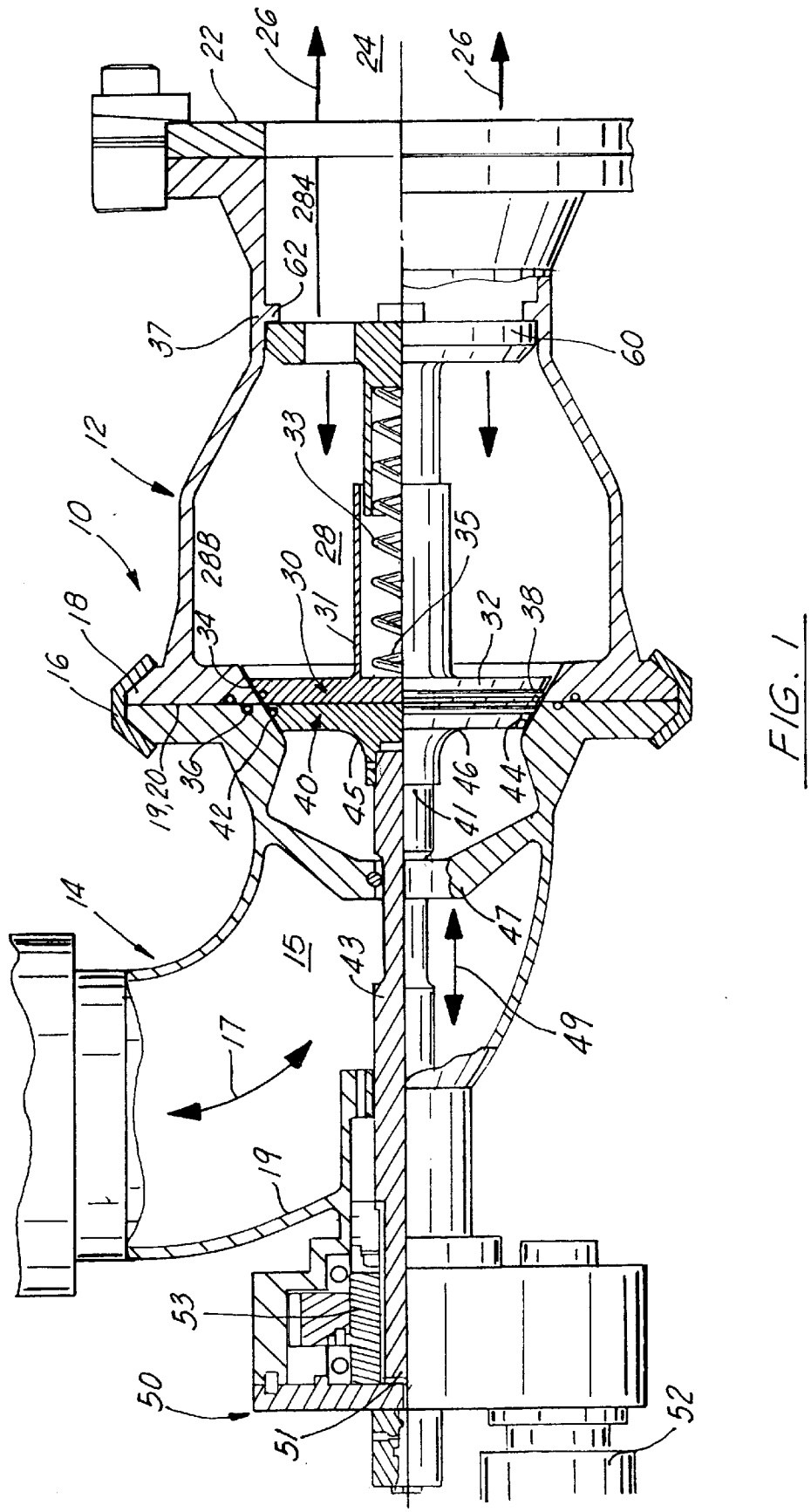
FIG. 1 illustrates an overall cross-sectional view of the improved check valve assembly mounted to an angle valve with the valving elements in the closed position.

FIGS. 1–7C illustrate the preferred embodiments of the apparatus of the present invention by the numeral 10. As illustrated in FIG. 1, there is included a first adaptor check valve assembly 12 engaged to an angle valve 14 for defining the dry disconnect coupling assembly 10 of the present invention. As illustrated, the check valve assembly 12 and the angle valve 14 in this particular embodiment, are secured together through an energy release collar clamp 16 secured around the outer edge of mating flanges 18 of the assembly 12 and the angle valve 14, to ensure a metal to metal seal between the respective faces 19, 20 of the angle valve 14 and check valve assembly 12. In this particular embodiment, the collar clamp 16 serves to maintain the two assemblies in engagement, as illustrated in FIG. 1, but should there be required a controlled break between assembly 12 and angle valve 14 due to a problem in the system, collar clamp 16 may be disengaged from around the assembly 12 and valve 14. This type of connection is particularly suitable for loading or unloading volatile fluids onto or off of ships, as will be discussed. However, for other situations, such as fluid delivered to or from chemical plants, the flanges 18 of assembly 12 and angle valve 14 may be secured through bolting or the like or other techniques, since there is usually no need for a controlled disconnect in such a stable environment.

Continuing with the discussion of the dry disconnect coupling assembly 10 utilizing the collar clamp 16, the second end face 22 of check valve assembly 12 (hereinafter assembly 12) would be engaged to a ship's manifold 24 which is illustrated in partial phantom view in FIG. 1. Assembly 12 is secured to ship's manifold 24 through bolting or the like, and would therefore allow fluid flowing to and from ship's manifold 24 in the direction of arrows 26 in order to move the stored fluid into or out from the storage tanks of the ship. As seen further in FIG. 1, the assembly 12 has a continuous flow bore 28 therethrough for allowing as was stated earlier, fluid to flow through the assembly to and from the ship being loaded or unloaded. The flow bore extends from a slightly restricted flow bore 28A to a rather enlarged flow bore 28B at the point where the second face 20 of assembly 12 engages to face 19 of angle valve 14.

It is noted that the flow bore 28B returns to a restricted type of flow bore as seen in FIG. 1 closed off via a sealing means 30. Sealing means 30 would be in the preferred embodiment a sealing check valve element 32 which would have an angulated sealing face 34 sealing along the inner wall 36 of the flow bore of assembly 12 via a sealing O ring 38 as illustrated in FIG. 1. Therefore, when check valve element 32 is in the position as seen in FIG. 1, there is a sealing off of the fluid flow in assembly 12 through bore 28 as illustrated. Furthermore, there is a second sealing element, which is identified as angle poppit valve 40, which is positioned within angle valve 14, and like check valve 32, also has a sealing face 42 sealing against the inner angulated wall 44 of angle valve 14, through the flow bore 15 of angle valve 14. It likewise includes an O ring 46 which is the sealing element between the inner wall 42 of angle valve 14 and the poppit valve 40 as illustrated. Therefore, at the sealing between faces 19, 20 of the assembly 12 and the angle valve 14, there is seen a double sealing elements in the nature of the check valve element 32 and the poppit valve 40 as illustrated.

As was discussed earlier, in this particular view in FIG. 1, both the check valve element 32 and the poppit valve 40 are in the sealing position; therefore, any fluid flow in the direction of arrows 26 in the assembly 12, or in the direction of arrow 17 in angle valve 14, is totally restricted and sealed from moving either way through the sealed zone, created by the check valve element 32 and the poppit valve 40.

Figure 2:
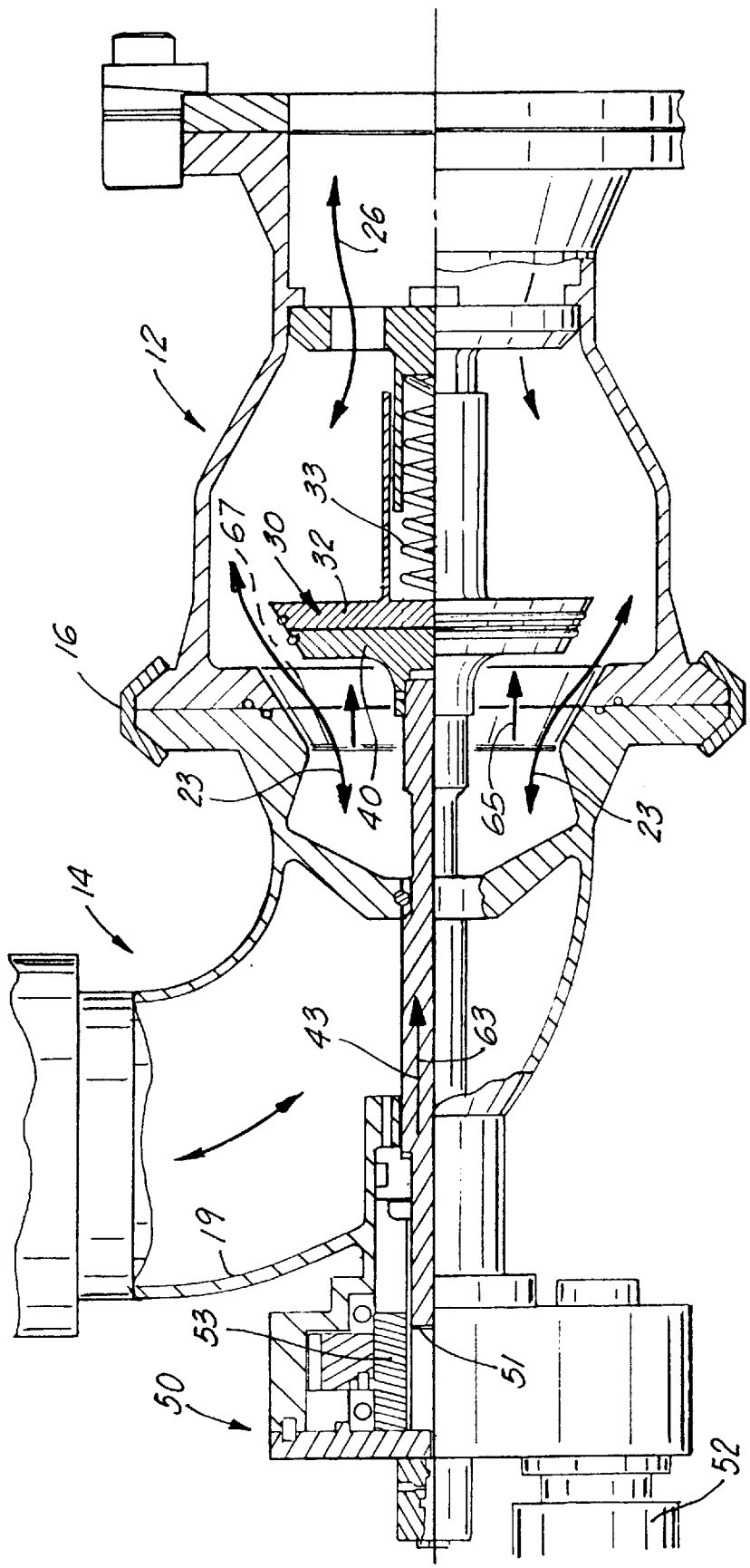
FIG. 2 illustrates a cross-sectional view of the check valve assembly mounted to an angle valve with the valving elements having been actuated to the open position for allowing fluid flow therethrough.

As also seen in FIGS. 1 and 2, there is included an actuator 50 which is a mechanism for providing the movement of both the check valve element 32 and poppit valve 40 between the first sealing position as seen in FIG. 1 and the open position as seen in FIG. 2. Prior to a discussion of this sealing function, reference is made to actuator 50 which would include a hydraulic motor 52 (in partial view) for hydraulically driving the actuator in its movement of the valving elements. As seen for example in FIG. 1, the poppit valve element 40 includes an upper circular housing 41 for engaging a poppit shaft 43. The poppit shaft 43 would again terminate within housing 41 at its lower end 45 and would extend upward through the face 19 of angle valve 14 into the actuator mechanism 50. The shaft 43 as it extends upward through angle valve 14 would be engaged onto a poppit guide shaft 47 which would be constructed in such a manner so as to prevent poppit shaft 43 from rotating as the shaft moves between up and down positions as seen by arrow 49. Shaft 43 terminates in the upper end 51 within actuator 50, and is secured via poppit drive nut 53 in order to accommodate its movement.

Positioned in sealing engagement in FIG. 1 as seen in assembly 12, check valve element 32 includes a lower circular collar 31 which accommodates a coil spring 33 with the coil spring 33 extending from a first upper end 35 terminating at the lower face of check valve 30, to a second lower end 37 housed within a spider element 60. Spider element 60, as illustrated in cross-section view, is an element which is fixed within the flow bore 28 of assembly 12 and rests on a shoulder 62 of assembly 12, with spider 60 having four radiating arms (not illustrated) which would define four flow spaces therebetween, so that fluid flowing through assembly 12 in the direction of arrow 26 would flow easily through spider element 60. Its only function is to accommodate and support the lower end 37 of spring 33, the function of which as will be described further.

Turning now to FIG. 2, there is illustrated again assembly 12 secured to angle valve 14. However, in this FIGURE, the valving element 32 and poppit valve 40 respectively have been moved to the open position for allowing fluid flow therethrough in the direction of arrow 26 as illustrated in the FIGURE. The movement of the valving elements 32, 40 from the first seal position as seen in FIG. 1 to the second open position as seen in FIG. 2, is accomplished by actuator 50. Upon the powering of hydraulic motor 52, the poppit shaft 43 is moved downward in the direction of arrows 63, and in doing so, pushes against the bias of coil spring 33, and the force of the hydraulically driven shaft 43 imparts downward movement of the valving elements 32, 40 in the direction of arrow 65. This creates the flow space 67 between the faces of the valving elements and the wall of assembly 12 and angle valve 14, therefore allowing fluid flow therethrough. As long as there is hydraulic force being imparted on shaft 43 which would overcome the force of spring 33, the valving elements 32 and 40 would be in the open position.

In this particular system, while fluid is flowing through the system 10 under very high pressure, often times a problem would arise that would require that the connection point between angle valve 14 and check valve assembly 12 be disengaged. For example, if a ship is being loaded on rough seas, it may be prudent to undertake a controlled shutdown of both the valving element 32 and the poppit valve 40, and allow the valving elements 32, 40 to disengage by removal of collar 16, rather than risk a rupture in the lines. However, as stated earlier, this must be done in a very controlled manner to avoid the possibility of back pressure in the lines.

Figure 3:
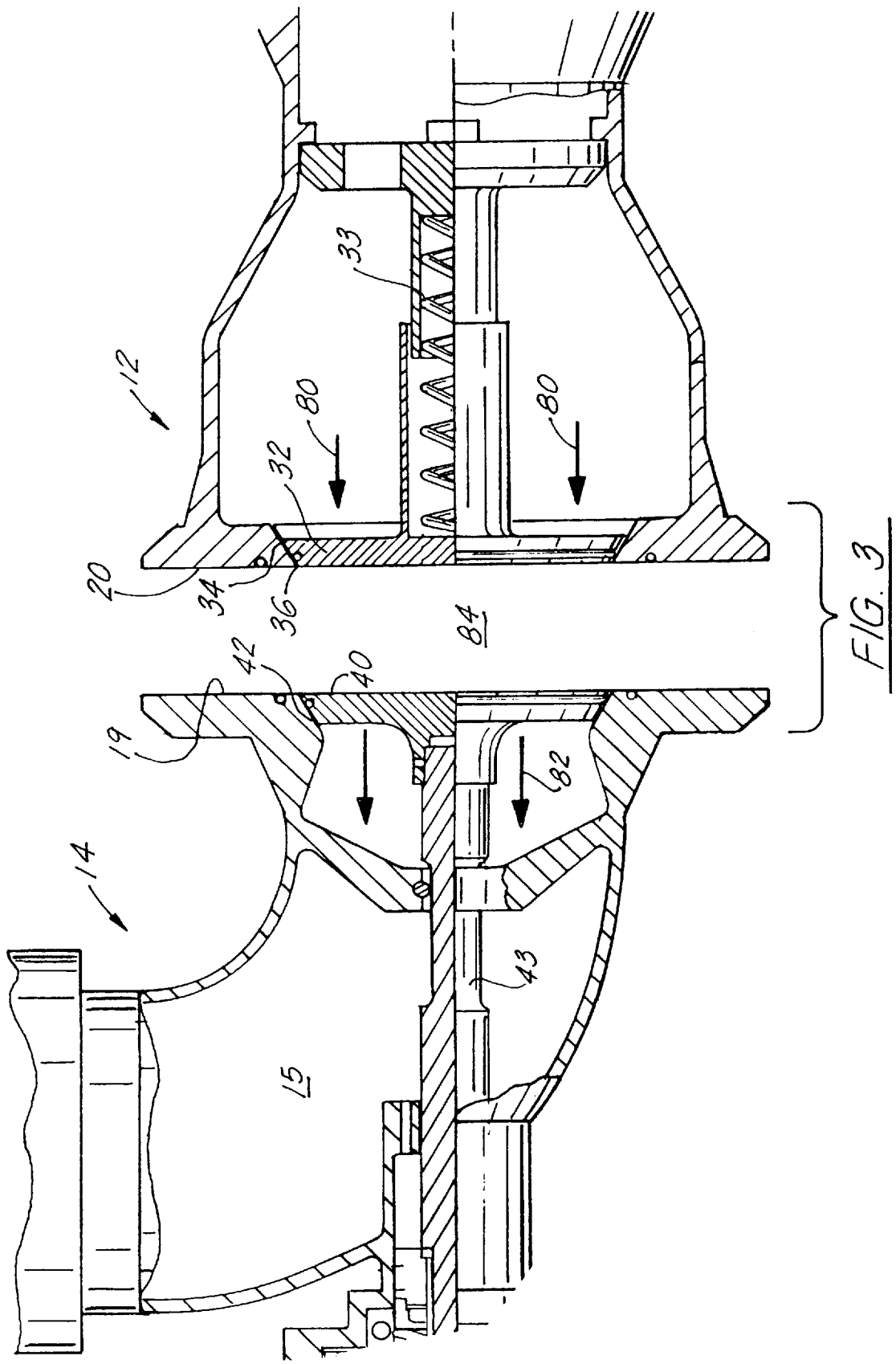
FIG. 3 illustrates a rupture in the point of engagement between the check valve assembly and the angle valve with the valving elements sealing against fluid flow respectively.

FIG. 3 illustrates the situation where there has been a decision to close valving elements 32, 40, and to allow the valve assembly 12 and angle valve 14 to disengage. As seen, the release collar clamp 16 which was maintaining the assembly 12 and angle valve 14 engaged adjacent one another, as illustrated in FIGS. 1 and 2, has been released. Of course, when this would be done, the assembly 12 and angle valve 14 would have been closed as discussed earlier. If the break between assembly 12 and angle valve 14 would have occurred during fluid flow, one could imagine the quantity of fluid that may be released were it not for the unique valving system of the present invention. It should be noted very clearly that as seen in FIG. 3, once the sealing elements 32 and 40 have sealed off their respective assemblies 12 and 14, since the sealing is flush with the faces 19 and 20 of the two assemblies any fluid which may have been contained within that area would have been extremely minimal and therefore very little fluid, if any, would be lost into the open environment 84 because of the positioning of the sealing elements.

Therefore, utilizing the dry disconnect system 10, the operator of the hydraulically activated actuator 50 would first allow the poppit shaft 43 to return to its position within actuator 50. This movement of shaft 43 would return the poppit valve 40 to its sealing position as seen in FIG. 1. Simultaneously, with shaft 43 no longer imparting force on valving element 32, spring 33 would automatically recoil upward and move the actuator valving element 32 from the open position as seen in FIG. 2 and return it to the sealed position as seen in FIG. 1. This controlled sealing of valving elements 32, 40 would be done over preferably eight to fifteen seconds, thus allowing the fluid flow to gradually be interrupted, and allowing any potential back pressure to dissipate over the entire system, resulting in no rupture to any other components in the system.

Of course, as seen in the sealing position in FIG. 3, following the controlled closure, any flow of fluid which was occurring as illustrated by arrows 23, is now completely interrupted and the valving elements are returned to the sealing engagement against the angulated faces of assembly 12 and angle valve 14.

Again, it should be noted that it is of particular interest that the valving elements 32, 40 of the present invention are being actuated (opened and closed) by the controlled linear movement of shaft 43 as driven by actuator 50. As noted, actuator 50 is positioned within an opening in the wall 19 of angle valve 14, and although there is an angle valve 14 which is being sealed, the movement of the valving elements are done in a linear fashion by shaft 43 which provides more strength and integrity to the sealing mechanism than in the current state of the art, and allows for the controlled movement of the elements as described earlier. As an aside, there may be the possibility that fluid which is flowing through both the assembly 12 and the angle valve 14 while the valving elements 32, 40 are in the open position as seen in FIG. 2, may enter actuator 50 via the housing around shaft 43. Therefore, the bore of the actuator 50 which accommodates shaft 43 has various sealing elements or O-rings which would disallow any fluid flow past the housing contained within the flow bore of the angle valve upward into the actuator mechanism which may do harm to the mechanism.

Figure 4:
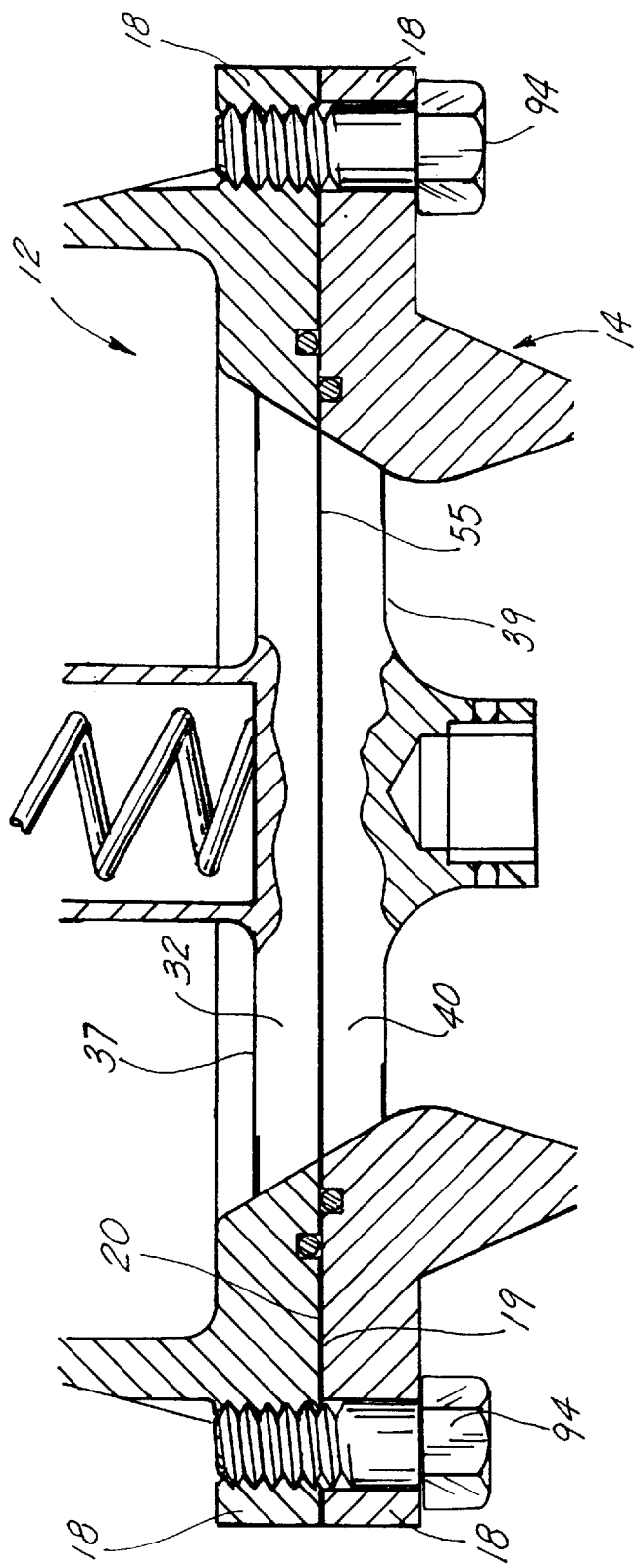
FIG. 4 illustrates a partial view of the valving elements sealed against the inner walls of the check valve assembly and the angle valve in the use of the present invention.

FIG. 4 illustrates the isolated view of the valve element 32 and valve element 40 in the sealing position within the actuator assembly 12 and angle valve 14 respectively. As illustrated, each of the valving elements 32, 40, in this particular embodiment are provided with a sealing means which would comprise a continuous sheet 55 of Teflon which would extend across each of the faces 19, 20 of the valving elements 32, 40, and along the angulated sealing faces 34, 42, of each of the valving elements, and would terminate at a point on the rear faces 37, 39 of each of the valving elements 32, 40. This particular embodiment would be preferably suitable for use in the chemical industry, where there are highly corrosive materials flowing through the system, which may do damage to the metal to metal seal of valving elements 32, 40 of the embodiment discussed earlier. This embodiment would also be suitable in the polymer industry where polymers would "glue" the seats together. This sheet 55 of Teflon, would assure a more consistent seal and a more durable seal between the valving elements 32, 40 in this particular application of the present invention. As is illustrated in this particular FIGURE, it should be noted that the flanges 18 of each of the assemblies 12, 14, are secured via bolts 94 as opposed to the sealing ring 16 as was shown in the preferred embodiment. Again, this is so, because in a chemical plant, there would be no need for a controlled disconnect as with a ship, due to the stable environment. Also illustrated in this particular view is that the faces 19, 20 of each of the assemblies 12, 14, include sealing O rings 21, 23, which serve to prevent any fluid flow along the mating surfaces of faces 19, 20 of each of the elements 12, 14.

Figure 5:
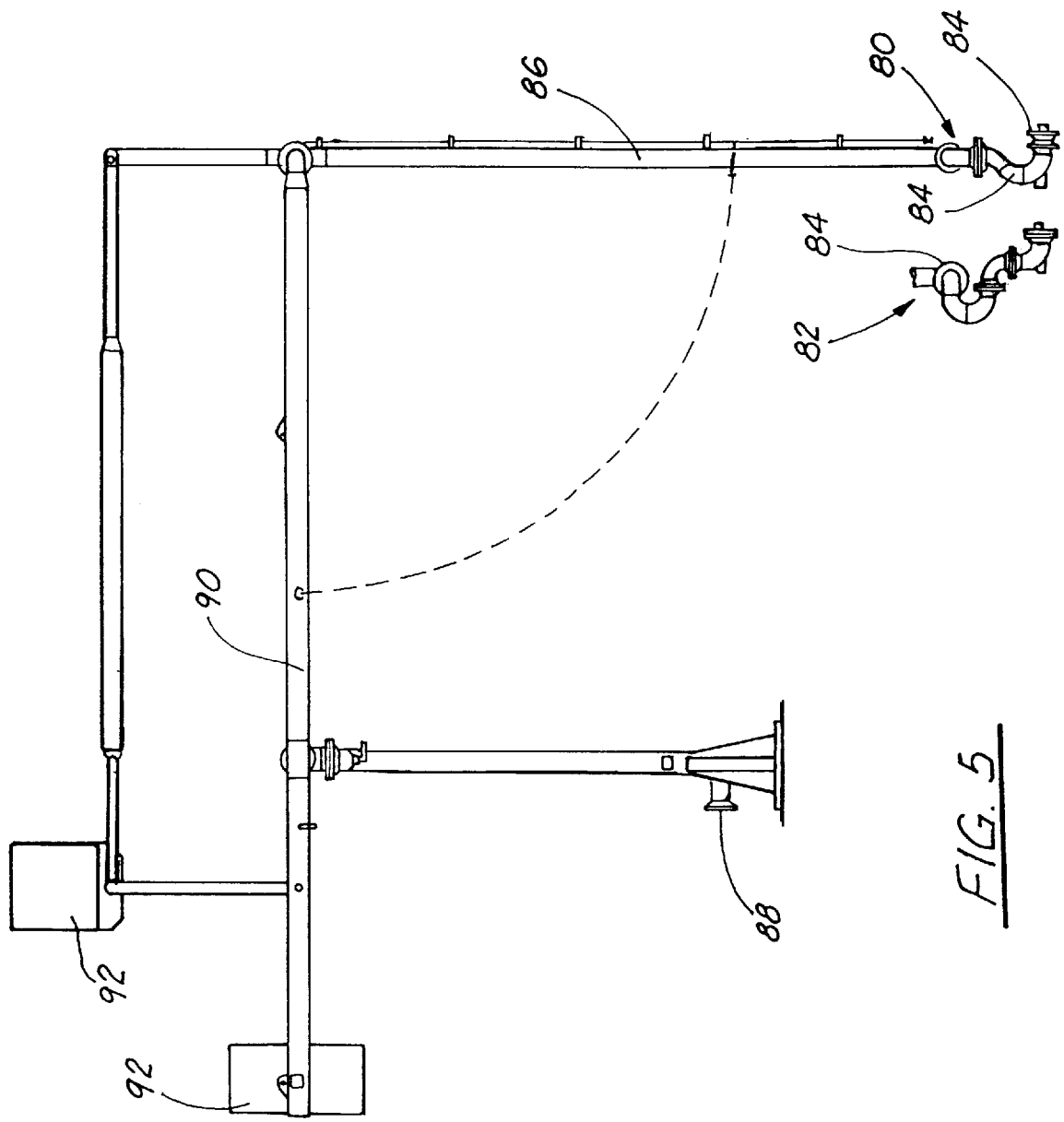
FIG. 5 illustrates an overall view of a general assembly for transporting fluids to and from a ship's manifold in which the present invention would be incorporated.

FIG. 5 illustrates the setting in which the assembly of the present invention would be utilized. As illustrated in the FIGURE, there is seen two types of assemblies for connecting onto a ship's manifold 24 which as illustrated, is a standard assembly 80 and a high slew assembly 82, each of the assemblies as illustrated having an elbow joint 84 wherein the present assembly 10 may be installed. Turning now, for example to the standard assembly 80, there is illustrated the ship's manifold 24 secured to the assembly, wherein the flow of the fluid would extend upward through an outboard arm 86, which would continue down to a drain point 88, for either outflow or inflow of the fluid from the ship. There is further illustrated an inboard arm 90, which has a system of counter weights 92, so that the assembly 80 that is secured to the ship's manifold is easily maneuverable due to its extreme size and weight. As illustrated, the actuator/valve assembly 10 of the present invention would normally be incorporated at the elbow connection 84 in the standard assembly 80 and at the elbow connection 84 in the high slew assembly 82. Therefore, when the actuator/valve assembly 10 would be in place, the system would operate as previously described in the specification.

Figure 6:
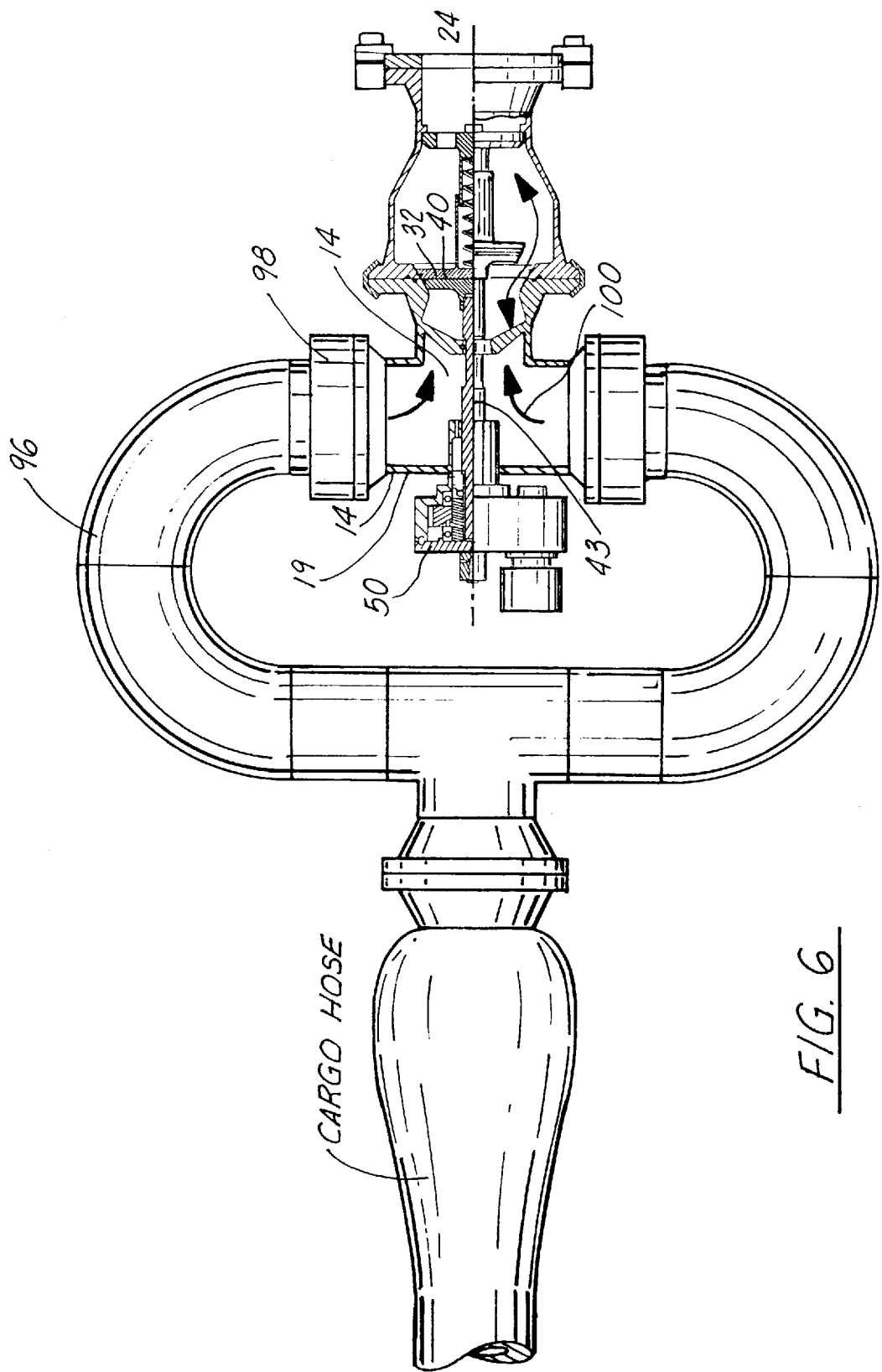
FIG. 6 illustrates an overall view of the improved check valve assembly mounted to an additional assembly configuration utilizing the present invention.

Turning now to FIG. 6, there is illustrated a T flow joint 96, which is an additional type of flow line which would accommodate this invention. Is utilizes a double angle valve 14 where fluid flows in and out of the T element via arrows 98, 100 and illustrates the fluid flow into the angle valve 14 from two different directions. However, it should be noted that actuator 50 again is mounted into the wall 19 of angle valve 14, and the same type of operation is occurring in the movement of the valving elements 32 and 40 via shaft 43 between the closed position and the open position as fluid flows to and from the ship's manifold 24 during the process. This is illustrated simply to show a configuration of an angle valve 14 that is configured in a slightly different type of flow pattern than was discussed in FIGS. 1–4.

Figure 7A:
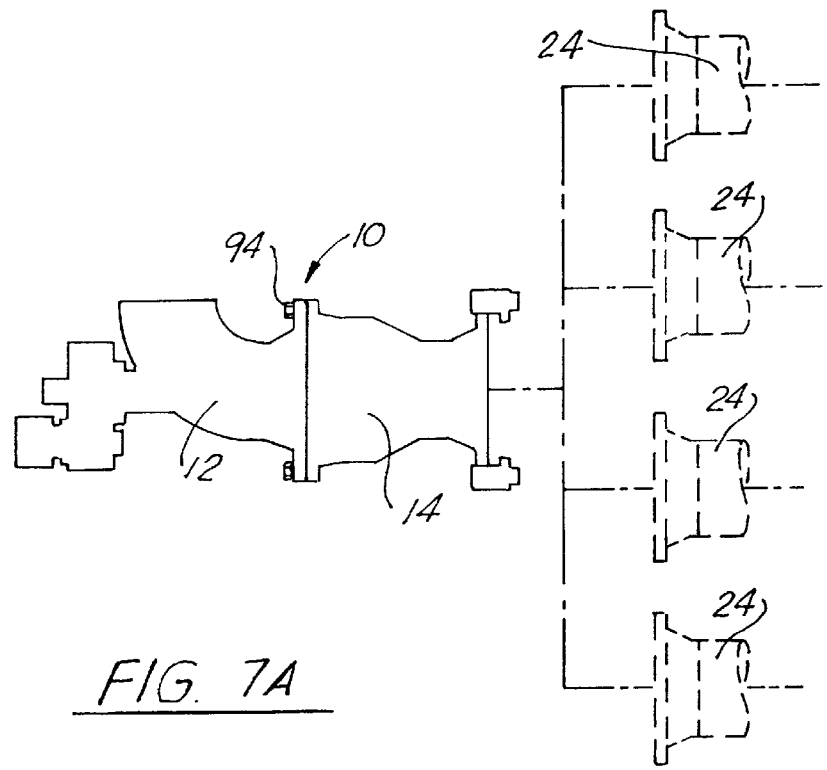
FIGS. 7A through 7C illustrate overall views of the types of manifold systems in which the present invention would be utilized.
Figure 7B:
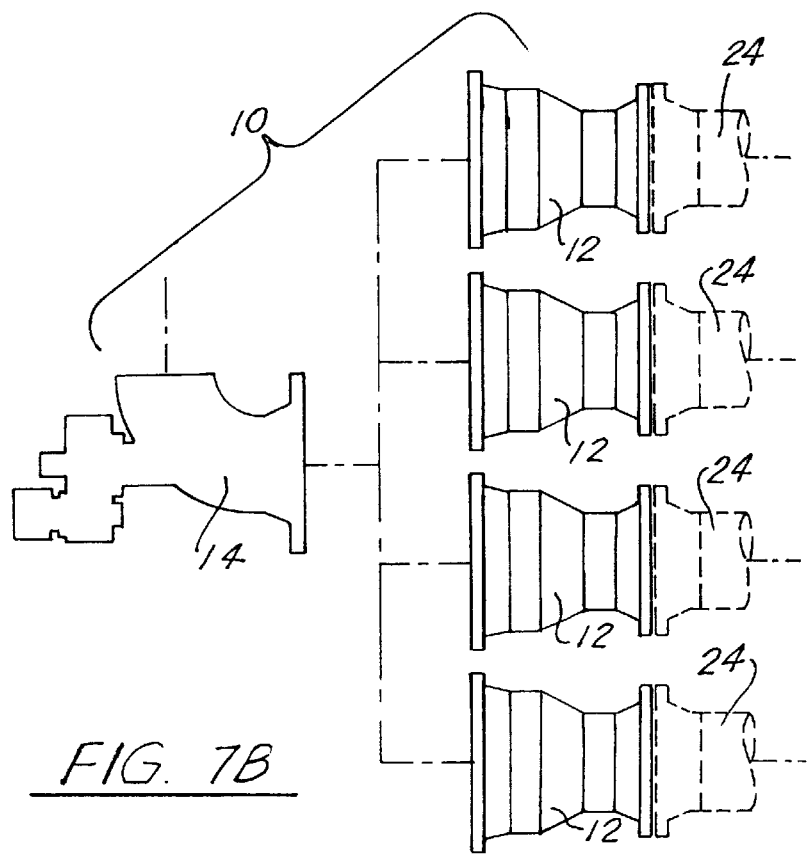
Figure 7C:
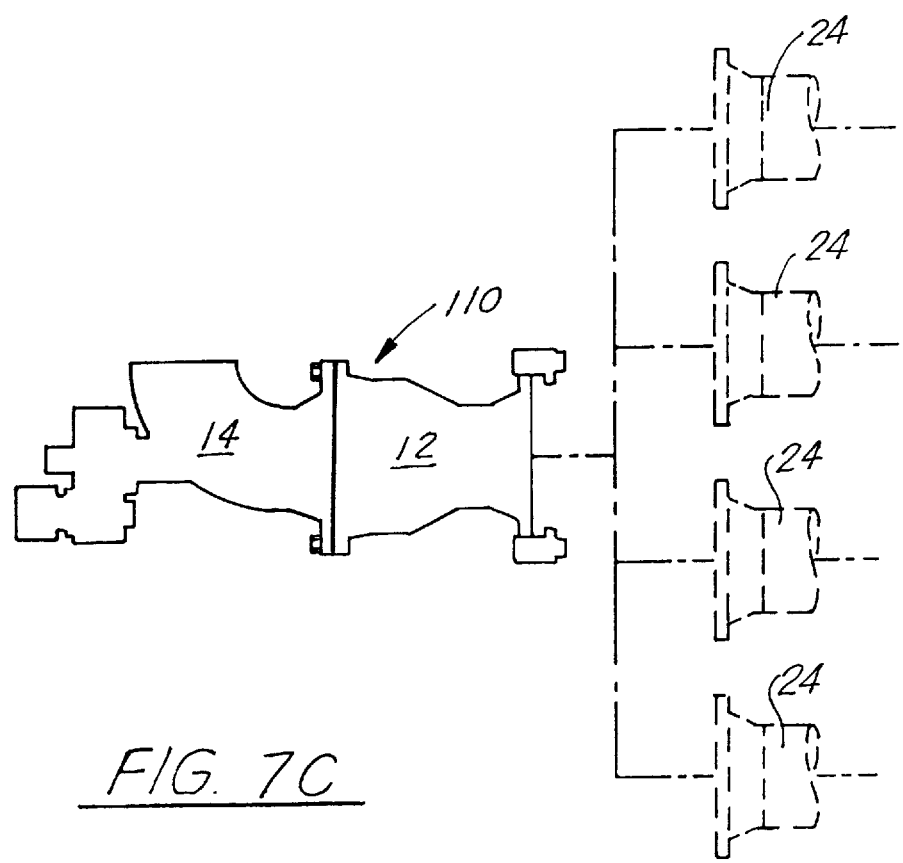

FIG. 7A–7C illustrate the different configurations of the dry disconnect coupling assemblies 10 that could be utilized. FIG. 7A illustrates the embodiment of the assembly 10 which would be utilized in the environment, for example, engaging to the manifolds 24 of a chemical plant, where the check valve assembly 12 and angle valve 14 are engaged with bolts 94, or the like, since, under normal circumstances, there would no requirement for the controlled disconnect feature. Of course, as illustrated, each manifold 24 would have to accommodate a separate valve assembly 12 during use.

FIG. 7B, on the other hand represents the assembly 10 of the preferred embodiment, as was discussed earlier, utilizing where the check valve assembly 12 coupled to a ship's manifold 24, and the angle valve 14 is illustrated uncoupled from assembly 12, following a controlled disconnect situation. Normally, assembly 12 would be coupled to angle valve 14 with a collar clamp 16. Again, FIG. 7B illustrates multiple manifolds 24, each with an assembly 12 secured thereto, and each would require a separate angle valve 14 coupled thereto for operation.

FIG. 7C illustrates yet another configuration of a composite assembly 110, which also would more suitable for chemical plants, not requiring a quick disconnect feature but a light weight positive valve. In this embodiment, the check valve assembly 12 and angle valve 14 are actually formed as a single composite assembly 110, with no need for engagement between the two. This embodiment, therefore, would have no need for bolting or collar clamps to secure the valve assembly 12 and angle valve 14 together, but would be in place as a single composite assembly 110 as illustrated, with each assembly 110 fixed to each manifold 24.

The following table lists the part numbers and part descriptions as used herein and in the drawings attached hereto.

| PARTS LIST | |
|---|---|
| Description | Part Number |
| coupling assembly | 10 |
| check valve assembly | 12 |
| angle valve | 14 |
| flow bore | 15 |
| collar clamp | 16 |
| arrow | 17 |
| mating flanges | 18 |
| face | 19 |
| second face | 20 |
| end face | 22 |
| arrows | 23 |
| manifold | 24 |
| arrows | 26 |
| flow bore | 28 |
| restricted flow bore | 28A |
| enlarged flow bore | 28B |
| sealing means | 30 |
| circular collar | 31 |
| check valve element | 32 |
| coil spring | 33 |
| sealing face | 34 |
| inner wall | 36 |
| o-ring | 38 |
| rear faces | 37, 39 |
| poppit valve | 40 |
| circular housing | 41 |
| sealing face | 42 |
| poppit shaft | 43 |
| wall | 44 |
| lower end | 45 |
| o ring | 46 |
| poppit guide shaft | 47 |
| arrow | 49 |
| actuator | 50 |
| upper end | 51 |
| hydraulic motor | 52 |
| drive nut | 53 |
| Teflon sheet | 55 |
| spider element | 60 |
| shoulder | 62 |
| arrow | 63 |
| arrow | 65 |
| flow space | 67 |
| arrows | 80 |
| arrow | 82 |
| open environment | 84 |
| standard assembly | 81 |
| high slew assembly | 82 |
| elbow joint | 84 |
| outboard arm | 86 |
| drain point | 88 |
| inboard arm | 90 |
| counter weights | 92 |
| bolts | 94 |
| T flow joint | 96 |
| arrows | 98, 100 |
| composite assembly | 110 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A dry disconnect coupling assembly, comprising:
   a) an assembly body having first and second ends, and a fluid flow bore therethrough;
   b) the first end of the assembly body secured to a manifold;
   c) the second end of the assembly body sealably engaged to a valving means having a flow bore therethrough;

d) a first valving element for sealing the flow bore through the assembly body;

e) a second valving element for sealing the flow bore through the valving means; and f) power means for controllably moving the first and second valving elements between a sealing position and an open position, wherein the first and second valving elements are moved as a single unit out of the sealing position for allowing fluid flow through the assembly body and the valving means, and for controllably returning the first and second valving element to the second sealing position preventing fluid flow through the assembly and the valving means when an operator wants to disconnect the assembly body from the valving means.

2. The assembly in claim 1, wherein the first and second valving elements are positioned adjacent one another so that when the operator disconnects the assembly body from the valving means, the valving elements have been controllably moved to seal off the assembly body and valving means resulting in a minimal loss of fluid out of each.

3. The assembly in claim 1, wherein the assembly body is secured to the valving means through an energy release collar clamp releasable by the operator.

4. The assembly in claim 1, wherein the valving means comprises an angle valve.

5. The assembly in claim 1, wherein the power means comprises a hydraulically driven actuator for moving the valving elements via a linear shaft driven by the actuator.

6. The assembly in claim 1, wherein the first valving element is moved to the open position against the bias of a coiled spring.

7. The assembly in claim 1, wherein the second valving element of the valving means comprises a poppit valve.

8. The assembly in claim 1, wherein the valving element of the assembly and the valving element of the valving means, when in the closed position, are substantially abutting one another, for defining minimal fluid flow space between the two elements.

9. The assembly in claim 1, wherein the coiled spring is in position between a lower face of the first valving element and a spider element secured within the assembly body.

10. A composite dry disconnect coupling assembly, comprising:

a) an assembly body having first and second ends, and a fluid flow bore therethrough;

b) the first end of the assembly body secured to a ship's manifold;

c) the second end of the assembly body sealably engaged to an angle valve assembly, having a flow bore therethrough, and in fluid communication with the assembly body flow bore;

d) a first valving element for sealing the flow bore through the assembly body;

e) a second valving element for sealing the flow bore through the angle valve assembly;

f) an actuator for maintaining the second valving element in sealing engagement within the angle valve assembly;

g) a coiled spring for maintaining the first valving element in sealing engagement within the assembly body;

h) said actuator hydraulically moving the first and second valving elements from first sealing positions preventing fluid flow to second open positions into the fluid flowbore of the assembly body for allowing fluid flow through the actuator assembly and the angle valve assembly; and i) the first and second valving elements positioned adjacent one another so that should there be a need to disengage the assembly body from the angle valve assembly, the actuator would controllably seal the first valving element against fluid flow through the angle valve assembly, and the coil spring would controllably seal the second valving element from fluid flow through the assembly body, so that pressure through the dry disconnect coupling assembly would equalize in the system before the first and second valving elements would seal off fluid flow.

11. The assembly in claim 10, further comprising means for disengaging the connection between the assembly body and the angle valve assembly after the first and second valving elements have moved to sealing positions.

12. The assembly in claim 10, wherein the actuator assembly is secured to the valving means through an energy release collar clamp.

13. The assembly in claim 10, wherein the first valving element and the second valving element are moved from the sealing to the open positions by a poppit shaft extending from the actuator to the second valving element, so that upon activation of the actuator, the shaft is linearly driven to move the first and second valving elements to the open position.

14. The assembly in claim 10, wherein the first valving element is moved to the open position by the poppit shaft against the bias of the coiled spring.

15. The assembly in claim 10, wherein the valving element of the angle valve assembly comprises a poppit valve.

16. The assembly in claim 10, wherein the valving element of the assembly body and the valving element of the angle valve assembly, when in the closed position, are substantially abutting one another, for defining minimal fluid flow space between the two valving elements.

17. The assembly in claim 10, wherein the coiled spring is positioned between a lower face of the first valving element and a spider element secured within the assembly body.

18. An assembly for controlling fluid flow to and from a manifold, comprising:

a) an actuator assembly body having first and second ends, and a fluid flow bore therethrough;

b) an angle valve, having a fluid flow bore therethrough;

c) the first end of the actuator assembly body secured to the manifold;

d) the second end of the actuator assembly body sealably engaged to the angle valve, establishing fluid communication between the actuator assembly body and the angle valve;

e) a first valving element in the fluid flow bore of the actuator assembly body;

f) a second valving element in the fluid flow bore of the angle valve;

g) an actuator for controllably moving the first and second valving elements to open positions into the fluid flowbore of the actuator assembly body for allowing fluid flow through the actuator assembly body and the angle valve assembly;

h) said actuator controllably moving the second valving element to a closed position within the angle valve assembly when required;

i) a coiled spring for controllably moving the first valving element in sealing engagement within the actuator assembly body when the second valving element is moved to the closed position by the actuator; and j) means for disengaging the angle valve assembly from the actuator assembly body so that the actuator assembly is free of the manifold after the valving elements are closed.

19. The assembly in claim 18, wherein the first and second valving elements are positioned adjacent one another so that when there is disengagement between the actuator assembly body and the angle valve, the valving elements would seal off the assembly body from the angle valve resulting in a minimal loss of fluid out of each.

20. The assembly in claim 18, wherein the first and second valving elements are moved from the sealing to the open position by a poppit shaft extending from the actuator to the valving elements, so that upon activation of the actuator, the shaft is linearly driven to move the valving elements to the open position for allowing fluid flow therethrough.

21. The assembly in claim 18, wherein the first valving element and the second valving element when in the closed positions, are substantially abutting one another, for defining minimal fluid flow space between the two valving elements.

* * * * *